Patented Sept. 25, 1945

2,385,711

UNITED STATES PATENT OFFICE 2,385,711

ISOMERIZATION OF PINENE TO CAMPHENE

William J. Kirkpatrick, Marshallton, Del., assignor to Hercules Powder Company, Wilmington, Del., a corporation of Delaware No Drawing. Application July 21, 1943, Serial No. 495,642

5 Claims. (Cl. 260—675.5)

This invention relates to improvements in terpene isomerization and more particularly to a new catalytic process for the preparation of camphene from pinene.

Camphene is an important chemical of industry from which many products of commerce are made, one of which is camphor. Many methods have been suggested in the literature for the preparation of camphene from bornyl chloride, each method attempting to produce a chlorine-free product. Attempts to produce chlorine-free camphene have led to the development of various one-step methods using a catalyst to promote the isomerization of pinene directly to camphene, thus eliminating the bornyl chloride stage. Many methods have been suggested using various types of catalysts both organic and inorganic as well as mineral to effect this one-step conversion of pinene directly to camphene. In all cases, where organic or inorganic type catalysts are used, the yield of desirable products has been relatively low as, for example, in the neighborhood of about 15%. Of the mineral catalysts, many are no better than the organic and/or inorganic types, while others have a more favorable catalytic function. In this latter group, the catalysts in most cases must be treated as by means of an acid to activate the surface thereof. This activation improves the behavior of the catalyst so that yields of camphene as high as 50% are realized. However, these relatively higher yields are obtained only after the pinene being isomerized has been subjected to prolonged heating periods in the presence of the catalyst.

Now, in accordance with the present invention, a new catalytic process has been discovered wherein it has been found that the mineral, halloysite, or a mineral product or rock containing essentially halloysite will act in the presence of an isomerizable terpene to effect the production of relatively high yields of pure camphene in a relatively short period of time.

The method in accordance with this invention is illustrated by the following specific examples, all parts and percentages being by weight unless otherwise specified.

EXAMPLE I

A quantity of halloysite was reduced in size by grinding to a grain size of approximately 100–200 mesh and washed with a relatively weak solution of acetic acid, then washed with distilled water and then heated at 250° C. for one hour. One part of this treated halloysite was added to 25 parts of freshly distilled commercial alpha-pinene containing about 96–97% alpha-pinene and the mixture heated to a temperature of 150° C. After 10 minutes of heating the reflux temperature was 170° C. Samples were drawn out from the reaction mixture at intervals as shown in Table I and analyzed with the following results:

TABLE I

| Time after adding catalyst, minutes | Per cent polymer | Per cent pinene | Per cent yield of camphene |
|---|---|---|---|
| 10 | Trace  | 18.3 | 60 |
| 20 | do | 10.6 | 55 |
| 60 | do | 4.25 | 50 |

Halloysite is an aluminum silicate mineral having a chemical formula approximating $$Al_2O_3 \cdot 2SiO_2 \cdot 2H_2O$$

Its crystal structure consists essentially of an irregular or disorderly stacking of layers which may be represented by the general type structural formula $O_6 \cdot Si_4 \cdot O_4(OH)_2 \cdot Al_4 \cdot (OH)_6$. The ideal type formula may be represented by means of the type formula $Al_{m-n}(Al_nSi_{2-n})O_5(OH)_4X_a$, where $m$ represents the total Al, $n$ the number of Al ions replacing Si in tetrahedral coordination, and $X_a$ the replaceable base ($a=0.02$, corresponding to an exchange capacity of about 0.08 milliequivalent per gram).

The mineral halloysite is best characterized by its X-ray powder pattern, which shows a very broad band (in some cases resolved into three closely spaced lines) corresponding to an interplanar spacing range of from about 2.6 to about 2.3 Angstrom units; the other principal diffraction lines being at 7.3, 4.4, 3.6, 1.68, 1.48, 1.28, and 1.23 Angstrom units.

The mineral catalyst used in Example I, which is a halloysite known under the varietal name of indianaite (found near Bedford, Lawrence County, Indiana), may be further characterized by the interplanar spacings obtained from an X-ray powder pattern given in the Table II below, together with the estimated intensities of the diffraction lines in Ni-filtered Cu radiation.

TABLE II

X-ray powder diffraction data of halloysite (Rocking wedge technique, Ni-filtered Cu radiation)

| d | I | d | I |
|---|---|---|---|
| 7.35 | $s^b$ | 1.978 | vw |
| 4.83 | m | 1.920 | vw |
| 4.38 | $vs^b$ | 1.784 | vw |
| 3.60 | $mw^b$ | 1.736 | vw |
| 3.34 | $vw^b$ (quartz line) | 1.677 | $vw^b$ |
| 3.18 | vw | 1.475 | $mw^b$ |
| 2.56 | w | 1.273 | $vw^b$ |
| 2.45 | w | 1.228 | $vw^b$ |
| 2.38 | w | 1.013 | $vw^b$ |
| 2.02 | vw | | | d=interplanar spacing in Angstrom units
I=estimated intensity
v=very
s=strong
m=medium
w=weak
b=broad line A typical analysis of indianaite is as follows: $SiO_2$ 40.26%; $Al_2O_3$ 37.95%; $Fe_2O_3$ 0.30%; CaO 0.22%; $Na_2O, K_2O$ 0.74%; $-H_2O$ 4.45%; and $H_2O$ 15.94% and its formula may be written typically as follows:

$$Al_{2.02}(Al_{0.09}Si_{1.91})O_5(OH)_4X_{0.02}$$

Halloysite is also often found associated with other minerals, among which may be mentioned endellite, sometimes called hydrated halloysite. Endellite on dehydration, transforms to halloysite.

The term "halloysite" as used throughout the description and in the claims is meant to include all varieties of minerals classifiable under the species of minerals known as halloysite, and all minerals containing essentially halloysite or any mineral capable of being transformed to halloysite under the conditions of this invention as, for example, endellite.

Halloysite operates as a catalyst in the lump or unground form but is preferably used in the ground form for purposes of maximum conversion, convenience of use, and uniformity of reaction. Although reaction rates increase with increase in the fineness of the catalyst, little effect of fineness is noted above a grain size of about 200 mesh.

The novel catalytic conversion of an isomerizable terpene to camphene may be carried out at between about 50° C. and about the reflux temperature of the terpene being treated. The preferred operating range is between about 155° C. and about 165° C. at normal atmospheric pressure. Under proper conditions of pressure, temperatures up to 200° C. or higher may be used.

Catalytic conversion of terpenes to camphene may be made in a relatively short period of time, when using halloysite or when using rock or a mineral product containing essentially halloysite. When alpha-pinene was isomerized in accordance with the method of Example I, it was found that a 90% conversion of the pinene was effected as the given temperature in ten minutes to give a yield of 60% camphene, based on total pinene used as compared to a four-hour reaction period ordinarily used by the methods of the prior art to give comparable yields of camphene under similar conditions of temperature. The time for complete conversion of the terpene being isomerized varies with the amount of catalyst used and the temperature employed. At normal pressures, the time may vary between about one hour and about eight hours. Completeness of the isomerization of pinene is desirable. When the reaction is not carried to completeness, unreacted terpenes as, for example, alpha-pinene remain in small percentages and because of the relative closeness of these unreacted terpenes and camphene, separation by the ordinary methods of fractional distillation is not feasible.

Terpenes that have been found to be isomerizable to camphene in the presence of halloysite are the isomerizable bicyclic terpenes as, for example, alpha-pinene, beta-pinene, and such pinene containing materials as gum turpentine, wood turpentine, sulfate turpentine, and fractions thereof.

The ratio of catalyst to the terpene being treated may vary between about 0.01 and about 0.1 and is preferably between about 0.03 and about 0.04.

The process in accordance with this invention may be carried out as a batch process in liquid or vapor phase or as a continuous process in these same phases.

From the foregoing description, it is apparent that a new method of producing pure camphene in an efficient, effective and economical manner has been discovered, wherein a terpene capable of being isomerized may be directly converted to camphene in a relatively short period of time by heating the terpene in the presence of the mineral halloysite or a mineral product or rock containing essentially halloysite.

What I claim and desire to protect by Letters Patent is:

1. The process of isomerizing a pinene, which comprises heating a pinene in the presence of halloysite until isomerization is at least partially complete.

2. The process of isomerizing turpentine, which comprises heating turpentine in the presence of halloysite until isomerization is at least partially complete.

3. The process of isomerizing alpha-pinene, which comprises heating alpha-pinene in the presence of halloysite until isomerization is at least partially complete.

4. The process of isomerizing beta-pinene, which comprises heating beta-pinene in the presence of halloysite until isomerization is at least partially complete.

5. The process of isomerizing alpha-pinene to camphene, which comprises heating alpha-pinene at a temperature of at least about 50° C. in the presence of halloysite until conversion into camphene is at least partially complete and separating camphene from the reaction mixture by means of distillation.

WILLIAM J. KIRKPATRICK.